(12) United States Patent
Fink et al.

(10) Patent No.: US 6,290,241 B1
(45) Date of Patent: Sep. 18, 2001

(54) FIXED-LENGTH COLLET CHUCK ASSEMBLY

(75) Inventors: Nicholas Fink, Manhasset; Dan Olsen, Huntington Station, both of NY (US)

(73) Assignee: MicroCentric Corporation, Plainview, NY (US)

( * ) Notice: Subject to any disclaimer, the term of this patent is extended or adjusted under 35 U.S.C. 154(b) by 0 days.

(21) Appl. No.: 09/534,428

(22) Filed: Mar. 23, 2000

(51) Int. Cl.$^7$ .................................................. B23B 31/10
(52) U.S. Cl. ........................... 279/50; 279/135; 279/146
(58) Field of Search ............................... 279/43, 50, 57, 279/134, 135, 146

(56) References Cited

U.S. PATENT DOCUMENTS

| | | | |
|---|---|---|---|
| 2,153,971 | * 4/1939 | Montgomery | 279/146 |
| 2,262,849 | * 11/1941 | Knecht | 279/1 |
| 2,375,734 | * 5/1945 | Montgomery et al. | 279/146 |
| 4,214,766 | 7/1980 | Rall et al. . | |
| 4,349,207 | 9/1982 | Fink . | |
| 4,676,516 | 6/1987 | Fink . | |
| 4,971,340 | * 11/1990 | Rall | 279/57 |
| 4,999,002 | 3/1991 | Fink . | |
| 5,330,224 | 7/1994 | Terwilliger et al. . | |
| 5,344,166 | 9/1994 | Fink . | |
| 5,480,164 | 1/1996 | Murphy . | |
| 5,762,345 | * 6/1998 | Nowak et al. | 279/146 |
| 5,855,377 | 1/1999 | Murphy . | |

OTHER PUBLICATIONS

Product Catalog Entitled "MicroCentric—Quick Change Collet System", prepared by MicroCentric, Corp., prepared prior to Dec. 1, 1999.

* cited by examiner

Primary Examiner—Daniel W. Howell
Assistant Examiner—Terrence Washington
(74) Attorney, Agent, or Firm—Anthony J. Casella; Gerald E. Hespos

(57) ABSTRACT

A fixed length collet chuck assembly for holding a workpiece in which the collet only translates radially and not axially is provided. The fixed length collet chuck has a longitudinal, central axis and includes a chuck body assembly and a collet. As a draw tube is pulled toward the spindle of a machine, such as a lathe, a tapered actuator forces ball bearings against a retaining plate and the ball bearings are forced radially outwards causing a taper ring to move axially away from the spindle and into contact with a bushing ring. The bushing ring is connected to a collet sleeve through three bushings which are radially and equally spaced around the longitudinal, central axis of the assembly. The inner surface of the collet sleeve tapers outward from the longitudinal, central axis of the assembly. A collet bears against the inner tapered surface of the collet sleeve. As the bushing ring moves axially away from the spindle, the collet sleeve moves in the same direction with its inner tapered surface bearing against the collet and causing the collet to collapse and move radially inward, thus gripping a workpiece. By actuating the fixed length collet chuck on a pull stroke, the collet will achieve greater clamping force by concentrating the actuating force in the direction of the machine spindle. This new and improved design is also compatible with the pull stroke of servo stop type bar feeders.

10 Claims, 7 Drawing Sheets

FIXED-LENGTH COLLET CHUCK ASSEMBLY

BACKGROUND OF THE INVENTION

The present invention relates generally to a collet chuck assembly for holding a workpiece and more particularly to a fixed length collet chuck assembly in which the collet only translates radially and not axially.

Chucks are utilized in machining operations wherein a workpiece must be securely gripped and rotated at high speed. Examples of such chucks are disclosed in U.S. Pat. Nos. 4,349,207; 4,676,516; 4,999,002 and 5,344,166, all issued to Anton Fink. In such machining operations, chucks are provided which are adapted to be rotated by a drive means such as a lathe, and include radially movable jaws or collets for gripping and releasing a workpiece. The chuck bodies are generally cylindrical in configuration with the master jaws or collet being disposed at one end thereof and being capable of movement between a radially inward closed position and a radially outward open position. In use, a workpiece is placed parallel to the longitudinal, central axis of the chuck body and the jaws or collet are closed radially inwardly about the workpiece. The rotation of the chuck body and the workpiece enables the latter to be machined. When the machining operation is completed, the jaws or collet are urged into a radially outward open position releasing the workpiece.

Collet chucks are typically more accurate and have greater gripping characteristics than a typical jaw chuck. One such collet is disclosed in U.S. Pat. No. 4,214,766 to Rall et al. Collets are generally sleeves or collars used for clamping or gripping workpieces or tools. Collets have conical surfaces or cams, which, when the collet is pulled back, interact with corresponding, opposing surfaces or cams on a mounting fixture or on the spindle. This interaction causes the collet to contract or expand to grasp or release a workpiece or tool, depending on the direction of movement. An advantage of collets is that they continue to grasp the workpiece or tool even at high rotational speeds when jaw chucks would have a tendency to loosen their grip due to centrifugal force.

While collets have been noted for holding parts concentric, they are not very accurate for holding part lengths. Slight variations in the diameter of the workpiece or stock could cause the collet to position the workpiece (differently. When and where a collet will grasp a workpiece depends on the difference in diameter between the open collet and the diameter of the workpiece. When a chucking diameter is smaller than a setup piece, the finished part will be longer than the setup piece. The reverse is also true; if the chucking diameter is larger, the finished part will be shorter than the setup piece. Precise workpiece diameter is therefore required if the workpiece is be positioned precisely and consistently in machining operations such as facing, side finishing, or cutting to precise lengths. In the alternative, a compensation system can be added to the machine but are costly and add complexity to an already complex mechanism.

To eliminate the need for compensation systems and for precise diameter workpieces, a fixed length collet chuck was designed as manufactured by MicroCentric Corporation of Plainview, N.Y. and disclosed in MicroCentric's product catalog, page 12. In this design, a pushing force is applied to close the jaws of the collet instead of the drawing action of a conventional collet chuck. A standard collet chuck body is assembled with a fitted taper seat. As the draw tube pushes forward, the taper seat moves forward clamping the collet on the workpiece in a radial direction with no axial movement. Other examples of collet chucks which control part lengths are disclosed in U.S. Pat. No. 5,330,224 to Terwilliger et al. and U.S. Pat. No. 5,480,164 and 5,855,377 to Murphy.

While eliminating the control length problem, this fixed length collet chuck does not maximize the efficiency of the chucking system since it operates in a direction opposite of the machine spindle. Also, the prior art fixed length collet chuck is not compatible with the new servo stop type bar feeders as manufactured by SMW Systems of Santa Fe Springs, Calif. These new bar feeders have a servo mechanism which electronically centers the feed position and feeds the bar out to a pre-set position. The pushing actuation of the prior art fixed length collet chuck tends to move the bar away from the servo stop that has been pre-set resulting in varying lengths of the finished product.

It is an object of the subject invention to provide a fixed length collet chuck in which the collet translates radially and not axially upon a workpiece.

It is another object of the subject invention lo provide a fixed length collect chuck which is actuated by a pulling motion in the direction toward the machine spindle.

A further object of the subject invention is to provide a fixed length collet chuck which exerts a greater clamping force.

It is a further object of the subject invention to provide a fixed length collet chuck compatible with a servo stop type bar feeder.

SUMMARY OF THE INVENTION

The above stated objects are met by a new and improved fixed length collet chuck. The subject fixed length collet chuck has a longitudinal, central axis and includes a chuck body assembly and a collet. The chuck body assembly is threadedly connected to a machine draw tube by a draw tube connector. The draw tube connector will be configured for the specific machine and needs to match the position and the thread size of the machine draw tube. The draw tube connector is threadedly attached to a hardened and grounded actuator. The actuator's outer surface is tapered toward the face of the spindle. A retaining plate is disposed about the draw tube connector to limit the movement of the actuator toward the spindle of the machine. A taper ring is disposed about the actuator comprising an annular surface facing toward the spindle and an opposed annular surface facing away from the spindle. The annular surface of the taper ring which faces the spindle tapers outward from the end closest to the actuator. The combination of the actuator, retaining plate and taper ring forms a circular channel throughout the chuck body assembly. This channel is filled with round ball bearings which act upon the actuator and the taper ring. As the draw tube is pulled toward the spindle by the machine, the draw tube and actuator are simultaneously pulled in the same direction. The taper of the actuator forces the ball bearings against the retaining plate and the ball bearings are forced radially outwards causing the taper ring to move axially away from the spindle.

As the taper ring moves axially away from the spindle, it comes into contact with a bushing ring. The bushing ring is connected to three bushings which are radially and equally spaced around the longitudinal, central axis of the chuck body. The opposite end of each bushing is connected to a collet sleeve. The inner surface of the collet sleeve tapers outward from the longitudinal, central axis of the fixed length collet chuck. A collet bears against the inner tapered surface of the collet sleeve. As the bushings move axially away from the spindle, the collet sleeve moves in the same direction with its inner tapered surface bearing against the collet and causing the collet to collapse and move radially inward, thus gripping a workpiece.

On the reverse stroke, the draw tube moves axially away from the spindle forcing the actuator in the same direction. As the actuator moves axially away from the spindle, the ball bearings are allowed to drop releasing the force exerted on the taper ring. The returned motion of the bushing ring, bushings and collet sleeve combination is energized by springs spaced radially throughout the collet body. Springs surrounding each of the three bushings and six additional springs provide the optimal force needed to retract the collet sleeve and unclamp the collet.

By actuating the fixed length collet chuck on a pull stroke, the collet will achieve greater clamping force by concentrating the actuating force in the direction of the machine spindle. This new and improved design is also compatible with the pull stroke of servo stop type bar feeders.

These and other features of the invention will be better understood through a study of the following detailed description and accompanying drawings.

DETAILED DESCRIPTION OF THE INVENTION

Figure 1:
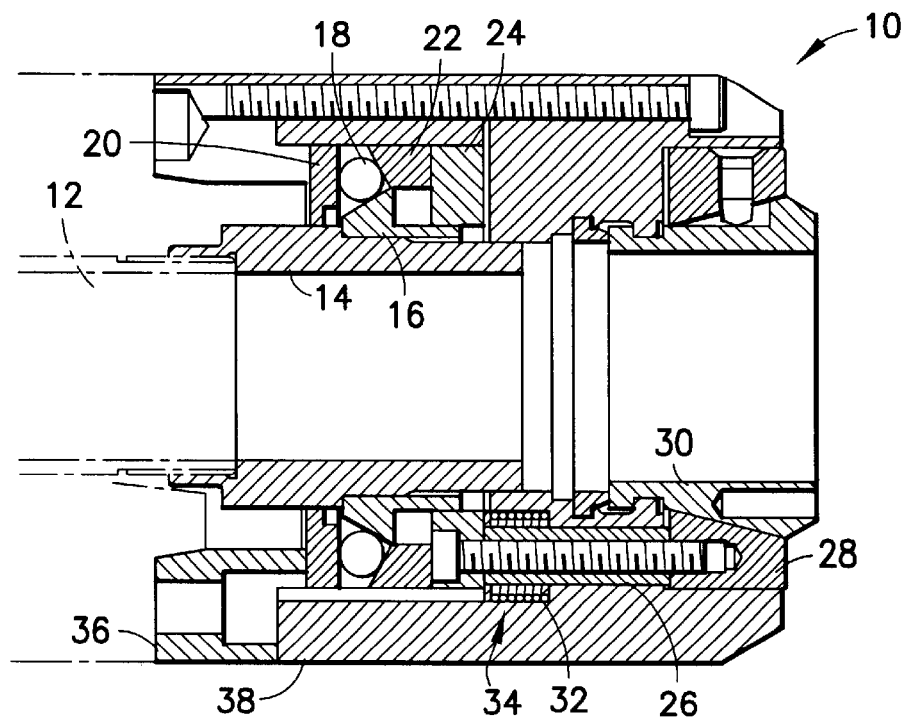
FIG. 1 is a cross-sectional view of the fixed length collet chuck of the subject invention.
Figure 2:
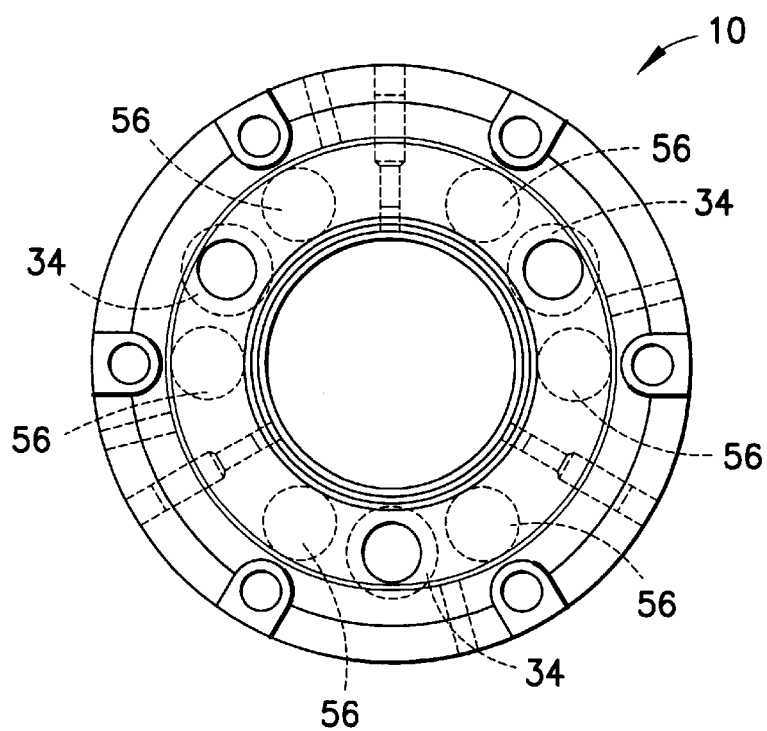
FIG. 2 is a elevational front view of the fixed length collet chuck of the subject invention.
Figure 3A:
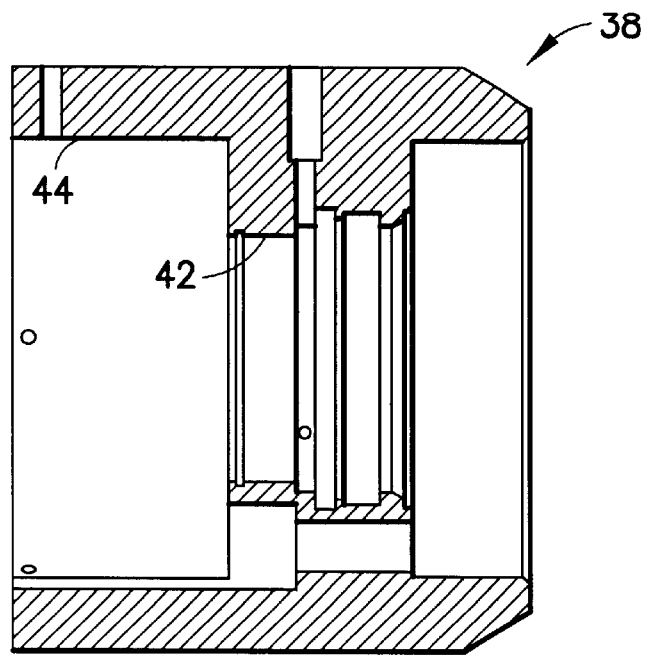
FIG. 3A is a cross-sectional view of the collet chuck body of the fixed length collet chuck of the subject invention.
Figure 3B:
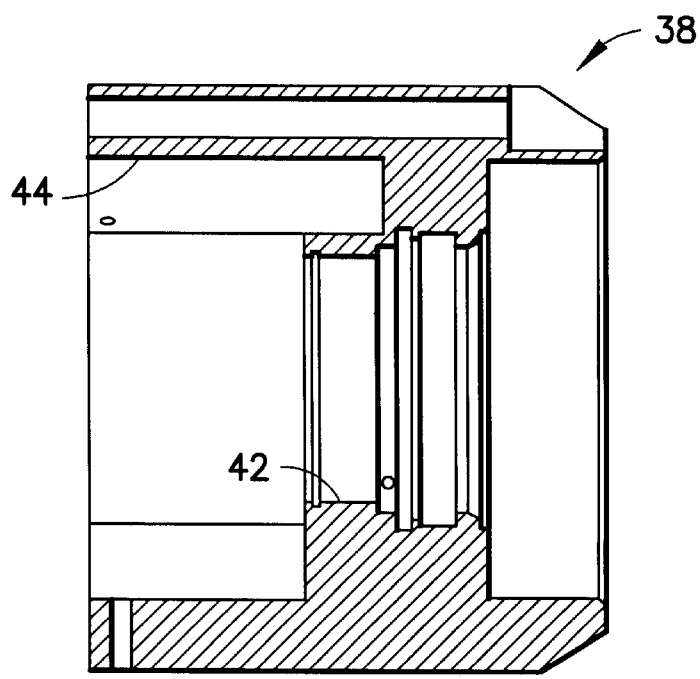
FIG. 3B is another cross-sectional view of the collet chuck body of the fixed length collet chuck of the subject invention.
Figure 4A:
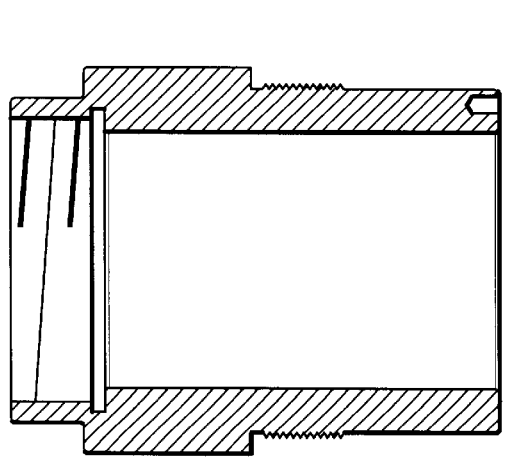
FIG. 4A is a cross-sectional view of the draw tube connector of the fixed length collet chuck of the subject invention.
Figure 4B:
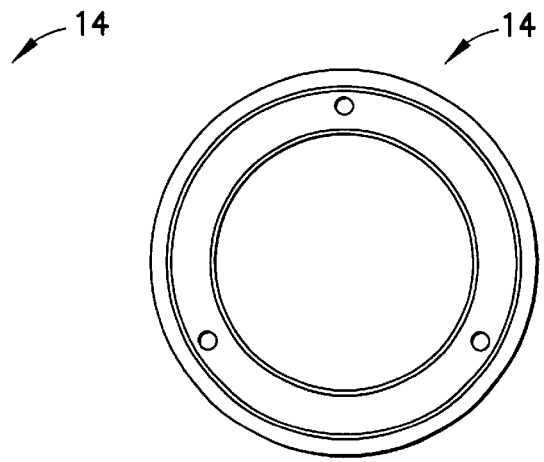
FIG. 4B is a elevational front view of the drawing tube connector of the fixed length collet chuck of the subject invention.

Referring to FIG. 1, the fixed length collet chuck assembly 10 according to the present invention is shown in cross-section attached to a machine spindle and machine draw tube 12 of a conventional machine tool such as a lathe. Draw tube connector 14 is threaded onto a machine draw tube 12 until the draw tube connector 14 is a predetermined distance from the spindle. In a clamping or gripping sequence, the draw tube 12 will move axially toward the spindle or to the left of FIG. 1. In a releasing sequence, the machine draw tube 12 will move axially away from the spindle or to the right of FIG. 1.

Figure 5A:
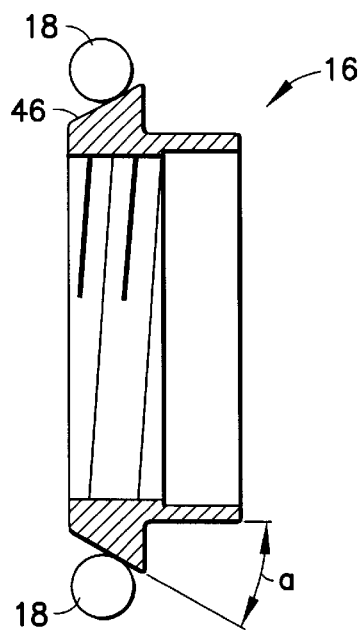
FIG. 5A is a cross-sectional view of the actuator of the fixed length collet chuck of the subject invention.
Figure 5B:
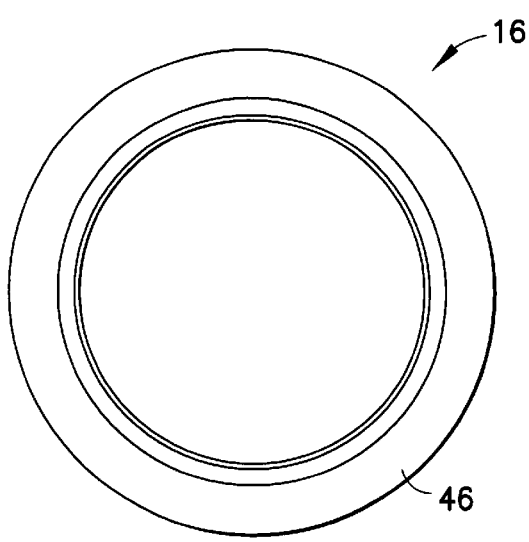
FIG. 5B is a elevational front view of the actuator of the fixed length collet chuck of the subject invention.
Figures 6A, 6B:
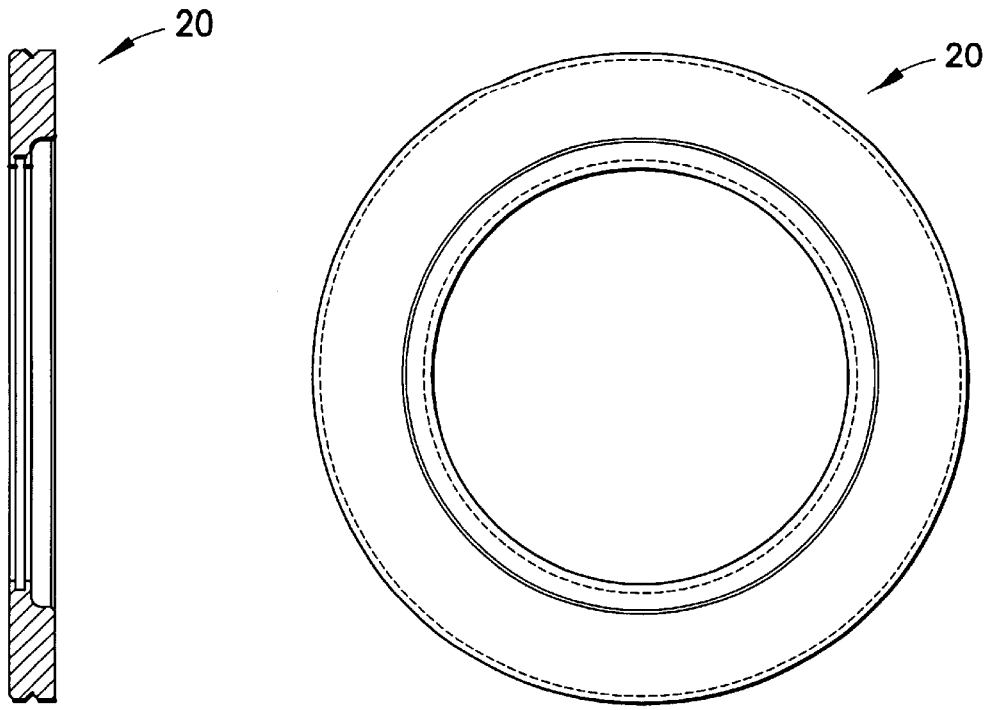
FIG. 6A is a cross-sectional view of the retaining plate of the fixed length collet chuck of the subject invention.
FIG. 6B is a elevational front view of the retaining plate of the fixed length collet chuck of the subject invention.
Figures 7A, 7B:
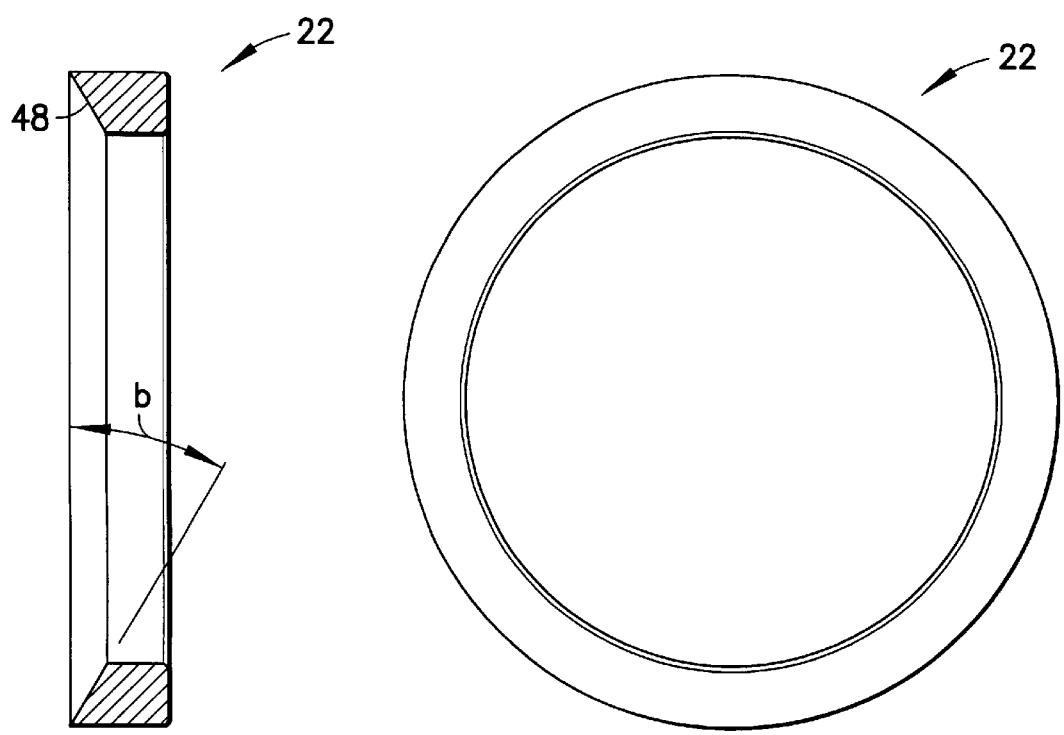
FIG. 7A is a cross-sectional view of the taper ring of the fixed length collet chuck of the subject invention.
FIG. 7B is a elevational front view of the taper ring of the fixed length collet chuck of the subject invention.
Figures 8A, 8B:
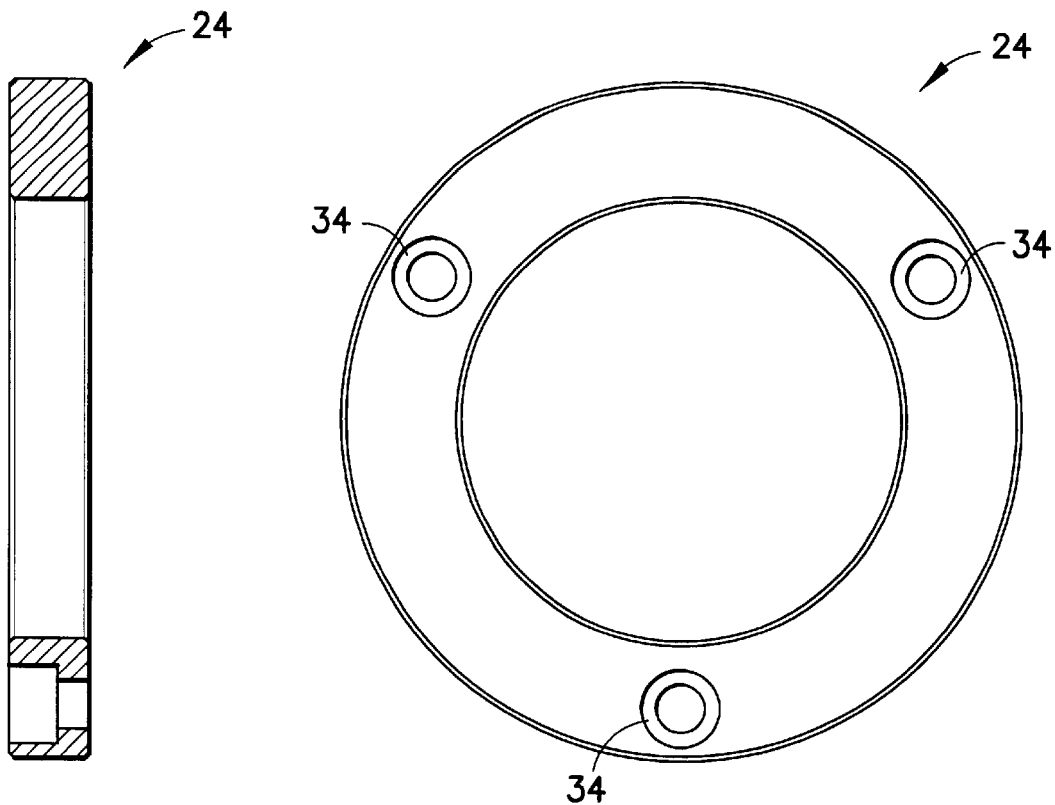
FIG. 8A is a cross-sectional view of the bushing ring of the fixed length collet chuck of the subject invention.
FIG. 8B is a elevational front view of the bushing ring of the fixed length collet chuck of the subject invention.
Figures 9A, 9B:
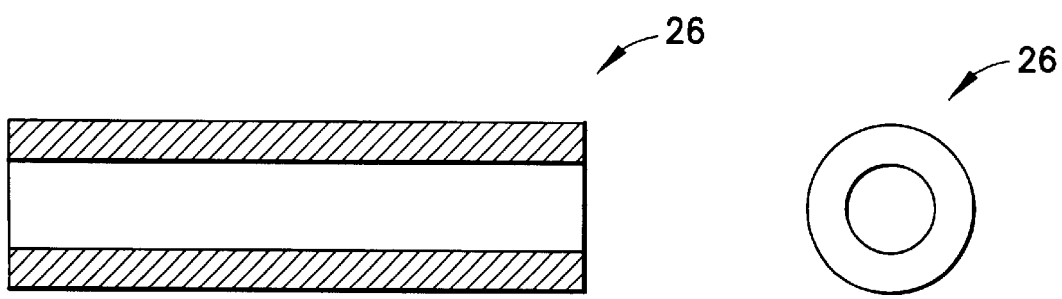
FIG. 9A is a cross-sectional view of the actuator bushing of the fixed length collet chuck of the subject invention.
FIG. 9B is a elevational front view of the actuator bushing of the fixed length collet chuck of the subject invention.

In the operation of clamping a workpiece, the machine draw tube 12 will move axially toward the spindle. The machine draw tube 12 is powered by a hydraulic cylinder which is provided by the machine manufacturer. A draw tube connector 14 is threadedly connected to the machine draw tube 12. An actuator 16 is threadedly disposed about the draw tube connector 14. Actuator 16 has an outer surface 46, as shown in FIG. 5A, which tapers outwardly from the end closest to the spindle. A retaining plate 20 limits the axial movement of the actuator 16 toward the spindle. A taper ring 22 is disposed around the actuator 16. The taper ring 22 has an annular surface 48, as shown in FIG. 7A, which tapers outward toward the spindle. The combination of the actuator 16, retaining plate 20 and taper ring 22 forms a circular channel therebetween throughout the fixed collet chuck assembly 10. This channel is filled with round ball bearings 18, approximately one-half inch in diameter. As the actuator 16 moves axially toward the spindle due to the movement of the machine draw tube 12, the ball bearings 18 resting upon the tapered surface 46 of the actuator 16 are forced radially outward. This radial movement of the ball bearings 18 bear against the tapered annular surface 48 of the taper ring 22 forcing the taper ring 22 to move in an axial direction away from the spindle. As the taper ring 22 moves axially away from the spindle, it comes into contact with a bushing ring 24. As shown in FIG. 8B, the bushing ring comprises three pockets 34 spaced equally upon the ring. Disposed within each pocket 34 are bushings 26 which extend through the chuck body 38 to a collet sleeve 28. The force applied to the bushing ring 24 is then transferred to the collet sleeve 28.

Figure 10A:
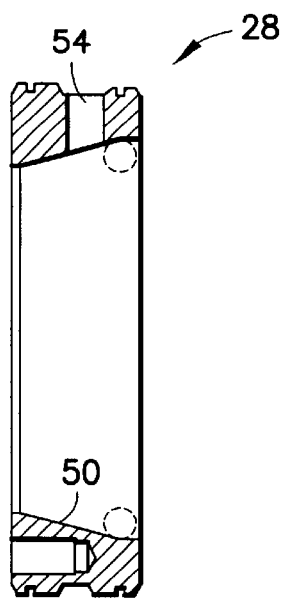
FIG. 10A is a cross-sectional view of the collet sleeve of the fixed length collet chuck of the subject invention.
Figure 10B:
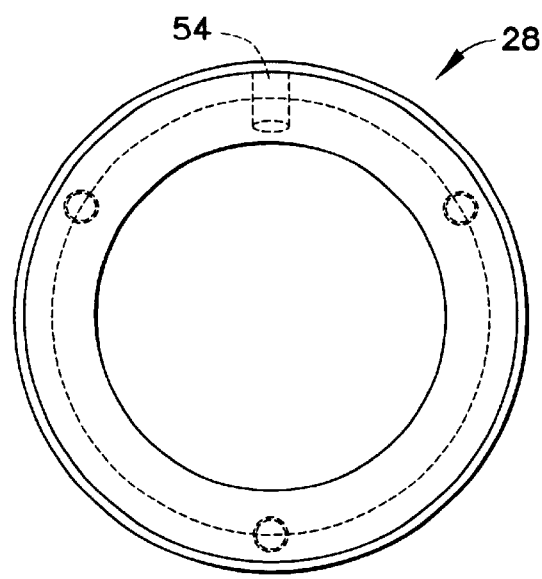
FIG. 10B is a elevational front view of the collet sleeve of the fixed length collet chuck of the subject invention.
Figure 11A:
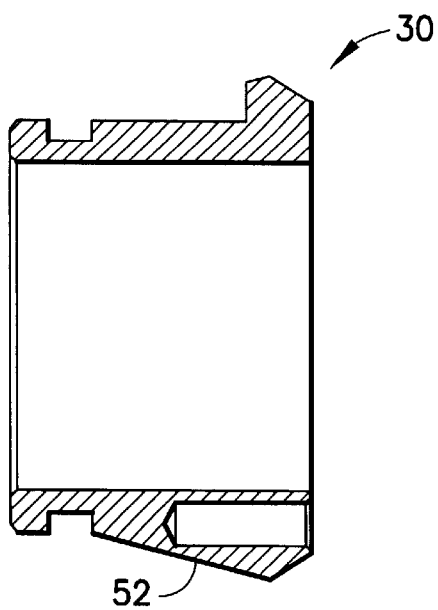
FIG. 11A is a cross-sectional view of the collet of the fixed length collet chuck of the subject invention.
Figure 11B:
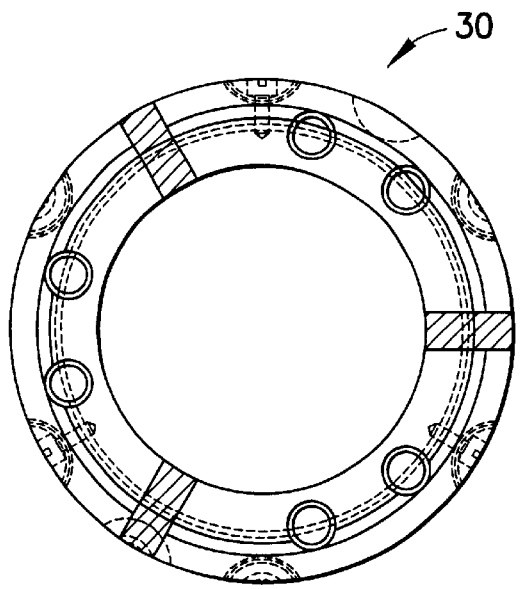
FIG. 11B is a elevational front view of the collet of the fixed length collet chuck of the subject invention.
Figure 12A:
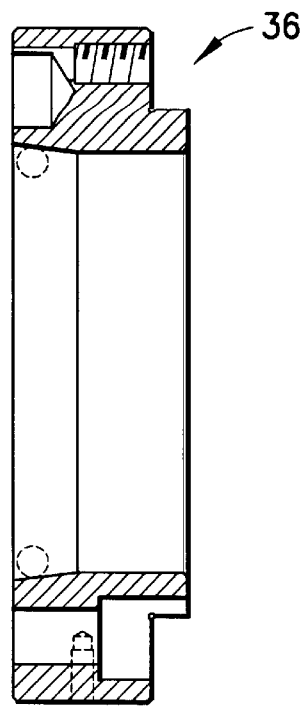
FIG. 12A is a cross-sectional view of the adapter plate of the fixed length collet chuck of the subject invention.
Figure 12B:
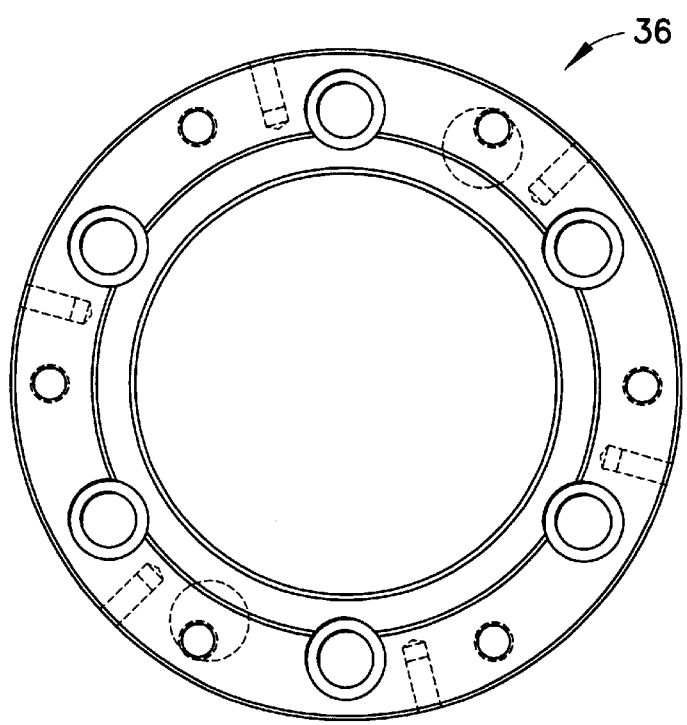
FIG. 12B is a elevational front view of the adapter plate of the fixed length collet chuck of the subject invention.
Figure 13:
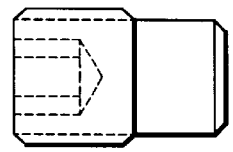
FIG. 13 is an elevational side view of the locating key of the fixed length collet chuck of the subject invention.

Referring to FIGS. 10A and 10B, the collet sleeve 28 is generally cylindrical with an inner surface 50 that tapers outward from the end closest to the spindle. An aperture 54 extends perpendicular to the longitudinal, central axis of the collet sleeve 28 which is adapted for a locating key 40 to retain a collet 30. Disposed within the collet sleeve 28 is a collet 30. The collet 30 is generally cylindrical with an outer surface 52 that tapers in the opposite direction of the inner surface 50 of the collet sleeve 28 so that the collet will be slidingly engageable with the collet sleeve 28. As the collet sleeve 28 moves axially away from the spindle, it bears against the outer surface 52 of the collet 30 causing the collet 30 to collapse and clamp upon a workpiece.

In releasing the workpiece, the machine draw tube 12 reverses its stroke and moves axially away from the spindle or to the right in FIG. 1. As the draw tube 12 moves axially away from the spindle, the actuator 16 will move in the same direction allowing the ball bearings 18 to move radially inward. Upon movement of the ball bearings 18, the force applied to the taper ring 22 is removed allowing the taper ring 22 to move axially toward the spindle. With the movement of the taper ring 22, the combination of the bushing ring 24, bushings 26, and the collet sleeve 28 are allowed to move axially toward the spindle. This movement is powered by springs 32 located in the pockets 34 surrounding each bushing 26. Six additional spring pockets 56 are located in the chuck body 38. These additional springs provide the optimal force for a smooth release of the collet 30.

By designing the actuator 16 and ball bearing 18 combination to accommodate a pull stroke, a much higher clamping force is achievable than with conventional push-to-close collet chucks. As seen in FIGS. 5A and 7A, actuation angle a of actuator 16 and, actuation angle b of taper ring 22 are approximately 30 degrees which result in a three-to-one multiplication of stroke of the draw tube. As the draw tube is stroked towards the spindle, the total stroke is 0.480 of an inch which in turn strokes the collet sleeve 0.160 of an inch. The stroke of the draw tube is proportional to the force applied to the collet. Therefore, the longer stroke of the draw tube translates into a higher clamping force of the collet. In testing, the clamping force of this new and improved design is approximately 40–50% higher than prior art fixed length collet chucks. This higher clamping force allows more aggressive machining operations to increase productivity and to reduce cycle times.

What is claimed is:

1. A fixed length collet chuck assembly for gripping and releasing a workpiece having a longitudinal, central axis, said assembly comprising:

a chuck body disposed about said longitudinal, central axis;

a draw tube connector disposed in said chuck body, said draw tube connector being threadedly coupled onto a draw tube of a machine spindle;

an actuator connected to said draw tube connector, said actuator being generally cylindrical and having an outer surface which tapers outwardly starting from an end of said actuator closest to said machine spindle;

a retaining plate disposed about said draw tube connector and rigidly fixed to said chuck body, said retaining plate limiting axial movement of said actuator;

a taper ring disposed about said actuator and including a first annular surface facing toward said machine spindle and an opposed second annular surface facing away from said machine spindle, said first annular surface inclined relative to said longitudinal, central axis and outwardly from said axis toward said machine spindle, with said actuator, said retaining plate, and said taper ring defining a channel;

a plurality of ball bearings disposed within said channel;

a bushing ring disposed about said draw tube connector adjacent to said taper ring;

a plurality of bushings coupled to said bushing ring and extending axially in the direction away from said machine spindle;

a collet sleeve disposed in said chuck body and coupled to a free end of said bushings, said collet sleeve being generally cylindrical and having an inner surface that tapers outwardly from said longitudinal, central axis starting at the end of said collet sleeve closest to said machine spindle; and a generally cylindrical collet including an inner and outer surface, wherein said outer surface tapers in a direction opposite of said inner surface of said collet sleeve and wherein said collet is slidingly engageable with said collet sleeve whereby, upon actuation of said draw tube, said collet sleeve moves axially away from said machine spindle engaging said collet causing said collet to radially collapse upon a workpiece.

2. A fixed length collet chuck assembly as in claim 1, wherein said outer surface of said actuator defines a first actuation angle in relation to said longitudinal, central axis.

3. A fixed length collet chuck assembly as in claim 2, wherein said first actuation angle is approximately 30°.

4. A fixed length collet chuck assembly as in claim 1, wherein said first annular surface of said taper ring defines a second actuation angle in relation to said longitudinal, central axis.

5. A fixed length collet chuck assembly as in claim 4, wherein said second actuation angle is approximately 30°.

6. A fixed length collet chuck assembly as in claim 1, wherein said plurality of bushings are individually disposed within coiled springs, wherein said springs actuate said collet sleeve in a direction toward said machine spindle upon a reverse actuation of said draw tube releasing said collet.

7. A fixed length collet chuck assembly as in claim 6, wherein a plurality of spring pockets are circumferentially disposed in said chuck body.

8. A fixed length collet chuck assembly as in claim 7, wherein a plurality of springs are disposed within said spring pockets, wherein said springs exert a force against said bushing ring which actuates said collet sleeve in a direction toward said machine spindle upon a reverse actuation of said draw tube releasing said collet.

9. A fixed length collet chuck assembly as in claim 1, wherein an aperture extends perpendicular to said longitudinal, central axis through said collet sleeve, wherein said aperture is adapted for a locating key to retain said collet within said collet sleeve.

10. A fixed length chuck assembly as in claim 1, wherein said actuator being threadedly connected to said draw tube connector.

* * * * *